(12) United States Patent
Cornell et al.

(10) Patent No.: US 6,701,077 B2
(45) Date of Patent: Mar. 2, 2004

(54) EXPOSURE CONTROL SYSTEM AND CAMERA HAVING SAME

(75) Inventors: David J. Cornell, Caledonia, NY (US); Joel S. Lawther, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 5 days.

(21) Appl. No.: 10/153,010

(22) Filed: May 21, 2002

(65) Prior Publication Data

US 2003/0219245 A1 Nov. 27, 2003

(51) Int. Cl.$^7$ ............................................. G03B 15/05
(52) U.S. Cl. ....................... 396/176; 396/179; 396/195; 396/206
(58) Field of Search ................................. 396/176, 179, 396/195, 180, 205, 206, 475, 478, 166, 168, 169

(56) References Cited

U.S. PATENT DOCUMENTS 3,051,066 A * 8/1962 Larue et al. ................. 396/195
3,464,333 A * 9/1969 Aoki et al. .................. 396/179
6,337,953 B1 * 1/2002 Nakanishi et al. ...... 396/195 X

FOREIGN PATENT DOCUMENTS

| JP | 08-278529 | 4/1995 | ............ G03B/9/58 |
| JP | 08-211447 | 8/1996 | ............ G03B/9/58 |
| JP | 11-282060 | 3/1998 | ........... G03B/15/05 |
| JP | 11-64940 | 3/1999 | ........... G03B/15/05 |

* cited by examiner

*Primary Examiner*—W. B. Perkey
(74) *Attorney, Agent, or Firm*—Ronald R. Schindler, II (57) ABSTRACT

In a first aspect of the present invention, a camera exposure control system is provided. The camera exposure control system has a shutter movable during an exposure period through a path of travel between a first position and a second position and a detector to sense the shutter and to generate a signal when the shutter is at a flash trigger position on the path of travel. A flash circuit is provided and receives the signal generated by the detector causing a flash of light to discharge when the signal is received. A stop is also provided. The stop is selectably movable from a location out of the path of travel of the shutter to a location in the path of travel of the shutter. The location of the stop determines whether the detector can sense the shutter during the exposure.

60 Claims, 10 Drawing Sheets

EXPOSURE CONTROL SYSTEM AND CAMERA HAVING SAME

FIELD OF THE INVENTION

The present invention relates to photographic cameras and, in particular, to photographic cameras having flash illumination systems.

BACKGROUND OF THE INVENTION

Conventional cameras capture images on a photosensitive element by exposing the photosensitive element to light from a scene. Such a photosensitive element is typically capable of recording useful images when exposed to light within a predetermined range. Thus, conventional cameras carefully meter exposures so that the light from the scene that strikes the photosensitive element is within the predefined range.

Exposure metering is typically controlled by a shutter mechanism. The shutter mechanism exposes the photosensitive element to light from the scene for a period of time known as an exposure time. The exposure time needed for a useful image to form on the photosensitive element is generally inversely proportional to the amount of light in the scene. Accordingly, many cameras feature an exposure control system that monitors photographic conditions such as the ambient light in a scene and that causes the shutter mechanism to modify the exposure time in proportion to the amount of light in the scene. This optimizes the appearance of the image captured on the photographic element. Often cameras incorporate flash systems that emit a flash of light to provide supplemental illumination of the scene. The exposure control systems of certain flash cameras adapt the operation of the shutter mechanism to modify the exposure accordingly.

It will be appreciated that such adaptive exposure control systems are complex and, accordingly, they can be challenging to design, manufacture and install in a camera. Thus, such exposure control systems are typically incorporated in more expensive point and shoot and single lens reflex cameras.

A lower cost exposure control approach is to provide a camera that has a fixed exposure time that is calibrated so that the camera is likely to capture an acceptable image under a wide range of conditions including ambient light images and flash images. However, a disadvantage of this solution is that such cameras are not fully optimized to capture images at the extremes of these ranges.

An example of such a camera is shown in JP 8-278, 529A which shows a camera with an exposure control system having a movable shutter and a camera body having various positions for receiving a stop that limits the path movement of the shutter blade during exposure. During camera manufacture, the stop is located at one of the positions. When the camera is recycled, the manufacturer can move the stop to shorten or extend the path of travel of the shutter. By shortening or extending the path of travel of the shutter, the exposure time is shortened or lengthened so that the same camera body can be used to accommodate the exposure needs of different film, flash, or lens arrangements. However, it is important to note that the location of the stop and therefore the exposure time is fixed until the next time the camera is recycled.

Thus what is needed is a low cost camera exposure control system that adapts the exposure to optimize the appearance of captured images.

One attempt to meet this need is JP 08-211,447 which shows a shutter mechanism that has a shutter that has a path of travel that is limited by a halt member. The halt member is movable to permit adjustment of the exposure. An opening in the cover permits a user to manually move the halt member. The biasing spring that propels the shutter is also connected to the halt member. As the halt member is moved, the amount of bias applied to the shutter changes. This changes the speed at which the shutter is moved during an exposure. This system requires that the user of the camera must make the determination as to which speed settings are appropriate for a particular photographic circumstance. However, this determination can be difficult for even advanced amateurs to make.

This determination becomes even more difficult to make when such a speed control is implemented in a camera that also incorporates a flash system the user can selectively enable and disable. This is because the presence or absence of flash illumination in a scene can significantly influence whether a particular speed setting is appropriate. Cameras having such user enabled flash systems are well known. One example of a camera having such a user enabled flash is shown in JP 11-282,060A. In this camera a flash illumination circuit is provided that discharges a flash of light when a switch is closed. The switch is a two contact switch that is controllably disabled by a user controlled insulator that is positioned between the two contacts. This prevents the contacts from engaging and disables the flash. In JP 11-282, 060 A, a similar system is used. However in this system, the contacts are bent apart from each other to prevent them from engaging as the shutter blade makes contact with the switch. JIP 11-64940 shows a flash illumination circuit having a switch with an on and off position wherein the illumination charge and discharge circuits are disabled by the switch. . This circuit requires that the flash illumination circuit is electrically adapted to accommodate this disabling switch. While such cameras provide the ability to selectably enable and disable the flash, they do not optimize exposure conditions to reflect the condition of the flash.

What is needed therefore is a low cost camera and camera exposure control system having a flash illumination system that can be enabled and disabled by a user and that automatically adjusts exposure characteristics to optimize the appearance of images captured in either flash or ambient light photography modes.

SUMMARY OF THE INVENTION

In a first aspect of the present invention, a camera exposure control system is provided. The camera exposure control system has a shutter movable during an exposure period through a path of travel between a first position and a second position and a detector to sense the shutter and to generate a signal when the shutter is at a flash trigger position in the path of travel. A flash circuit is provided and receives the signal generated by the detector causing a flash of light to discharge when the signal is received. A stop is also provided. The stop is selectably movable from a location out of the path of travel of the shutter to a location in the path of travel of the shutter. The location of the stop determines whether the detector can sense the shutter during the exposure.

In another aspect of the present invention, a camera is provided having a housing with an opening to admit light from a scene. An imaging gate is provided and positions an imaging surface to receive the light from the scene. A shutter is provided and is movable during an exposure period through a path of travel between a first position wherein the shutter blocks light from the scene from traveling to the imaging surface and a second position wherein the shutter permits light from the scene to travel to the imaging surface. A detector sense the shutter and generates a signal when the shutter is at a flash trigger position in the path of travel. A flash circuit receives the signal generated by the detector and causes a flash of light to discharge when the shutter electrically engages the contact. A stop is provided and is selectably movable from a location out of the path of travel of the shutter to a location in the path of travel of the shutter. The location of the stop determines whether the shutter can engage the contact during the exposure.

BRIEF DESCRIPTION OF THE DRAWINGS

FIG. 1b shows a front view of an embodiment of an exposure control system in the embodiment of FIG. 1a.

DETAILED DESCRIPTION OF THE INVENTION

Figure 1A:
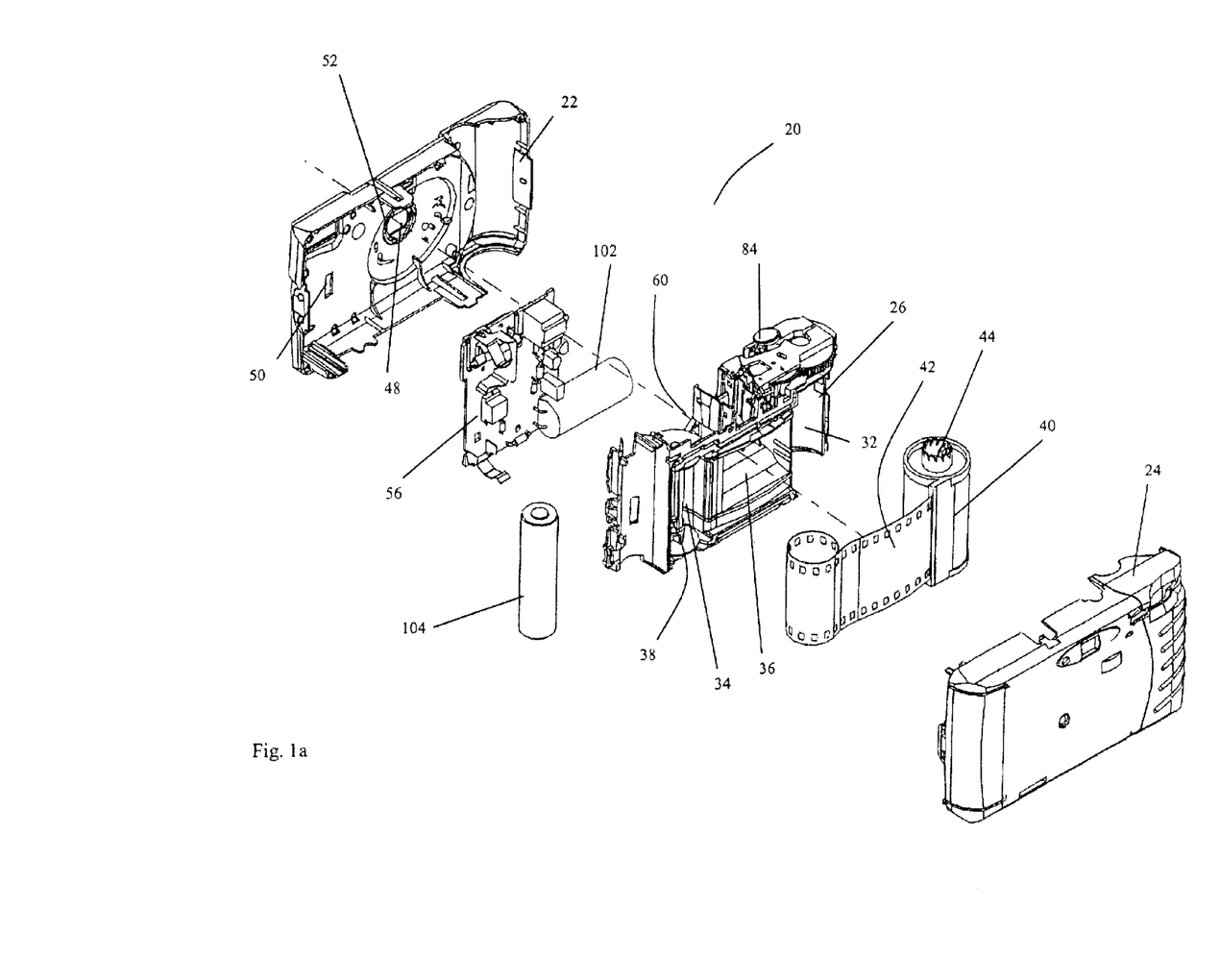
FIG. 1a shows an assembly view of a camera of the present invention.
Figure 1B:
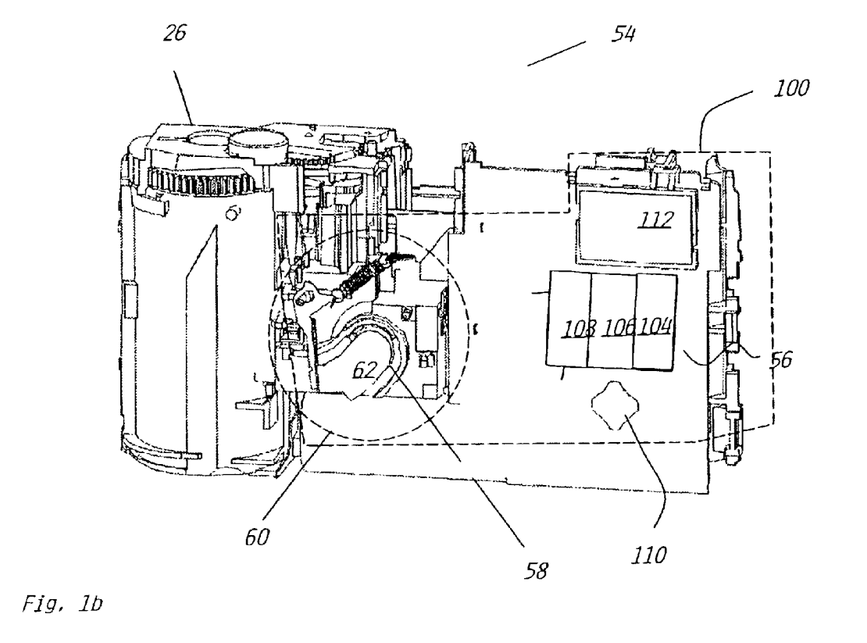

Tuning now to FIGS. 1a and 1b what is shown is a diagram of an embodiment of camera 20 of the present invention. As shown in FIG. 1a, camera 20 has a first cover 22 and a second cover 24. A frame 26 is disposed between first cover 22 and second cover 24. Frame 26 can be a component that is separate from but joined to first cover 22.

Alternatively, frame 26 can be formed in whole or in part by features of first cover 22. In the embodiment shown, camera 20 records images on a photographic element comprising a film 42 disposed at least partially in a film canister 40. Frame 26 has a film canister holder 32 and a film supply reel area 34. Disposed between film canister holder 32 and film supply reel area 34 is an image capture area 36.

In the embodiment of FIGS. 1a and 1b, film canister holder 32 is adapted to receive a film canister 40 containing a length of film 42. A length of film 42 is drawn from film canister 40, across an image capture area 36 and wound about a film supply reel 38 that is disposed in film supply reel area 34. During winding, winding mechanism 30 engages hub 44 and draws film 42 from supply reel 38 across image capture area 36 and into film canister 40. It will be appreciated that other conventional methods can be used for moving film 42 between film canister holder 32 and film supply reel 38.

First cover 22 has light opening 48 aligned with image capture area 36. A lens 52 is disposed in light opening 48 to focus light from a scene to form an image on film 42 during an exposure. An exposure control system 54 is positioned between lens 52 and image capture area 36. In the embodiment shown in FIGS. 1a and 1b, exposure control system 54 comprises a flash board 56 and shutter mechanism 60. Shutter mechanism 60 has shutter blade 62 shown positioned in front of and blocking light from passing through a light passageway 58 that is aligned with lens 52 and image capture area 36 to pass light from a scene to film 42. In the embodiment of FIGS. 1a and 1b, flash board 56 is joined to camera frame 26 which acts as a base to support both flash board 56 and shutter mechanism 60.

Figure 2:
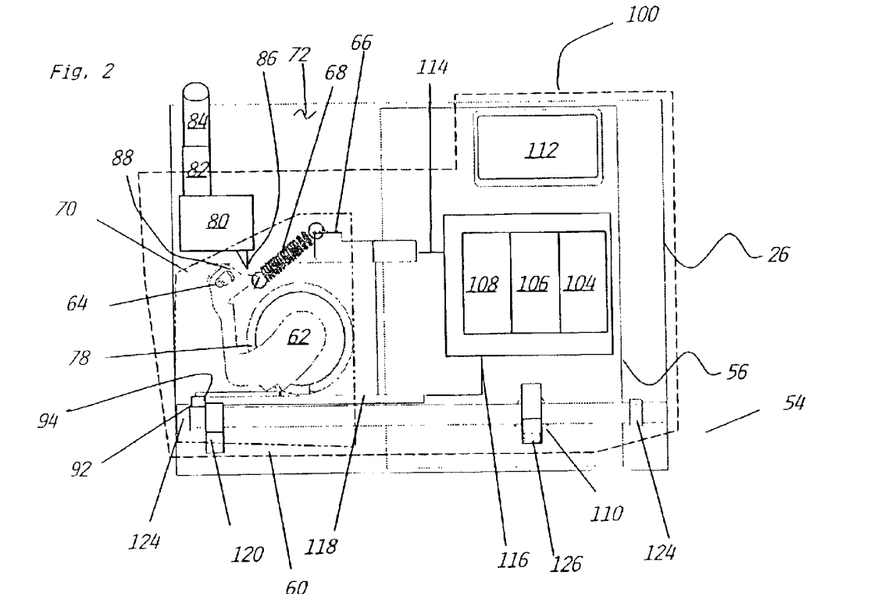
FIG. 2 shows a front view of one embodiment of an exposure control system of the present invention.
Figure 3:
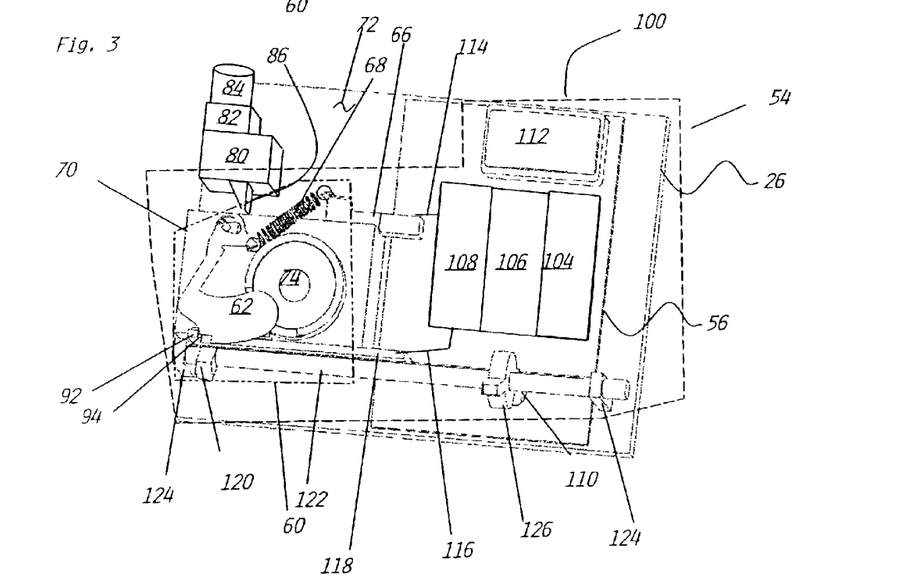
FIG. 3 shows a front perspective view of one embodiment of an exposure control system of the present invention.

FIGS. 2 and 3 show, respectively a front view and a front perspective view of an embodiment exposure control system 54. In the embodiment shown, exposure control system 54 comprises a shutter mechanism, a flash system and a control system. The shutter mechanism 60 comprises a movable shutter blade 62 pivotally mounted to pivot 64, a resilient member mounting 66 and a resilient member 68. Resilient member 68 joins shutter blade 62 to resilient member mounting 66. In the embodiment shown, shutter blade 62, pivot 64, resilient member mounting 66 and resilient member 68 are supported by an optional spacer 70. Spacer 70 elevates shutter blade 62, pivot 64, and resilient member 68 above a top surface 72 of frame 26. Spacer 70 defines passageway 74 which is aligned with image capture area 36, light opening 48 and light passageway 58 to allow light from the scene to pass to film 42.

Shutter blade 62 is pivotally movable between a first position shown in FIG. 2 and a second position shown in FIG. 3. When shutter blade 62 is in the first position, shutter blade 62 blocks light from passing from the scene through passageway 74 to the film 42. In the embodiment shown, shutter blade 62 is biased so that it normally remains in the first position between exposures. This bias is applied by resilient member 68 which draws shutter blade 62 into the first position. In the embodiment of FIGS. 2 and 3, the first position is defined by the position wherein resilient member 68 draws shutter blade 62 into engagement with stop 78 on spacer 70. The bias applied by resilient member 68 holds shutter blade 62 in this position and prevents inadvertent exposure of film 42 to light.

To capture an image on film 42, shutter blade 62 is rapidly moved through an exposure cycle beginning with shutter blade 62 starting in the first position, travelling to the second position and ending in the first position. This requires that shutter blade 62 be driven against the bias provided by resilient member 68. A variety of conventional mechanisms can be used to drive shutter blade 62 from the first position to the second position. An example of such a mechanism is an elastically deformable high-energy lever 80. Between exposures, high-energy lever 80 is latched by a latch 82. During film winding, a film winding mechanism 30 elastically deforms high-energy lever 80. This stores potential energy in high-energy lever 80. When a trigger button 84 is depressed, latch 82 releases the high-energy lever 80. High-energy lever 80 has a latch drive surface 86 that applies the released energy to a shutter drive surface 88 on shutter blade 62. The discharged stored potential energy is sufficient to drive shutter blade 62 to move rapidly from the first position to the second position.

As is shown in FIG. 3, when shutter blade 62 reaches the second position, shutter blade 62 impacts a post 92 having a contact 94. This impact exhausts the energy imparted on the shutter blade 62 by the high-energy lever 80. The resilient member 68 then rapidly returns shutter blade 62 to the first position.

It will be appreciated therefore that shutter mechanism 60 provides an exposure time that is defined by the amount of time required for shutter blade 62 to travel from the first position to the second position and to return to the first position. Thus, the position of post 92 has a significant impact upon the exposure time. Exposure time can be increased by positioning post 92 at a position that requires a greater degree of rotational movement of the shutter blade 62 during the exposure cycle. Similarly, exposure time can be decreased by positioning post 92 at a position that requires a lesser degree of rotational movement of shutter blade 62 during the exposure cycle.

Exposure control system 54 further comprises a flash circuit having a flash capacitor 102, a power supply 104, a flash charging circuit 106, a flash discharge circuit 108, a flash charging control switch 110 and a flash tube 112. Prior to a flash exposure, flash charging control switch 110 is depressed. Flash discharge circuit 108 is connected between flash capacitor 102 and power supply 104. Flash charging circuit 106 is actuated by flash charging control switch 110. In response to closure of flash charging control switch 110, flash charging circuit 106 draws electrical power from power supply 104 and applies this power to flash capacitor 102. This causes an electrical charge to be stored in flash capacitor 102.

Power supply 104 typically comprises a direct current battery cell providing a low voltage source. Flash charging circuit 106 operates to convert this low voltage into an output signal that is applied across flash capacitor 102 to store energy in flash capacitor 102 at a higher voltage level suitable for causing a discharge of light from the flash tube 112. This higher voltage level can comprise a voltage of between 250 and 350 vdc while the low voltage is typically below 32 volts. In this regard, flash charging circuit 106 can comprise any known voltage up circuit including but not limited to the so-called "press and hold" charging circuits and "one touch charging" circuits known to those skilled in the art. Examples of both "press and hold" and "one touch charging" circuits that can be usefully employed for this purpose are shown in commonly assigned and co-pending U.S. patent application Ser. No. 10/033,482 entitled CAMERA ELECTRONIC SYSTEM AND METHOD OF ASSEMBLING SAME, filed in the name of Douglas W. Constable on Dec. 27, 2002.

Flash discharge circuit 108 defines an electrical circuit between flash capacitor 102 and flash tube 112. Flash discharge circuit 108 is electrically connected in series with a detector 90. Detector 90 is adapted to sense when shutter blade 62 is positioned at a flash trigger position in the path of travel and to generate a signal. In this regard detector 90 can comprise an electro-optical sensor, an electromechanical switch adapted to generate a signal when the shutter engages the switch. Detector 90 can also comprise an electromagnetic sensor that generates an electromagnetic field and senses shutter blade 62 by detecting changes in this electromagnetic field that occur as shutter blade 62 passes through the electromagnetic field. Other well known sensing systems can also be used for detector 90.

Figure 4:
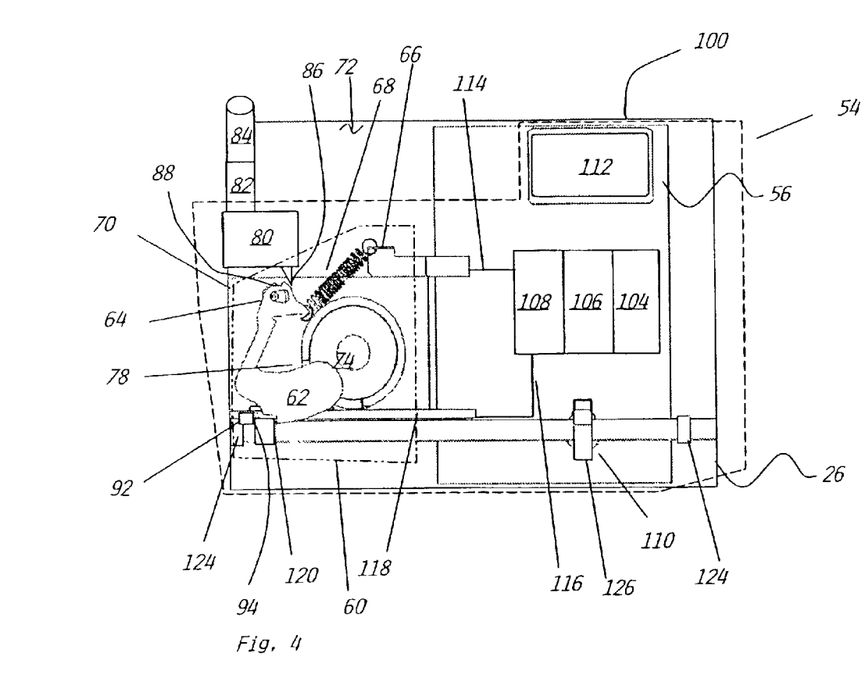
FIG. 4 shows a front view of the exposure control system of FIGS. 2 and 3 with the flash disabled.

A particularly advantageous embodiment of detector 90 is shown. In this embodiment detector 90 comprises contact 94. In the embodiment shown, contact 94 and shutter blade 62 are electronically wired in series with resilient member mounting 66, resilient member 68 and leads 114, 116 and 118. Each of contact 94, shutter blade 62, resilient member mounting 66, and resilient member 68 are electrically conductive and electrically define a series electrical path between flash capacitor 102 and flash tube 112. Contact 94 and shutter blade 62 are electrically isolated from each other except when shutter blade 62 is in a position wherein shutter blade 62 engages contact 94. In the embodiment of FIGS. 2–4, this occurs when shutter blade 62 reaches the second position. When shutter blade 62 is in the second position, shutter blade 62 electrically engages contact 94. This generates a signal that causes flash discharge circuit 108 to apply the electrical energy stored in flash capacitor 102 across flash tube 112. This releases energy stored in flash capacitor 102 and causes a flash of light to discharge from flash tube 112. Accordingly, in the camera of FIG. 1, a flash of light is emitted from flash tube 112 in a manner that is synchronized with the action of shutter blade 62 during an exposure cycle.

Camera exposure control system 54 further comprises a control system comprising stop 120, and a drive member 122. Stop 120 is selectively movable from a position out of the path of travel of shutter blade 62 to a position in the path of travel of shutter blade 62. In the embodiment shown, drive member 122 comprises a dial rotatably mounted in mountings 124 that are joined to flash board 56 of camera exposure control system 54. Stop 120 and drive member 122 are joined for common movement. A user control feature 126 is also joined to drive member 122 for common movement.

When camera exposure control system 54 is joined to first cover 22, user control feature 126 projects out of control opening 50 of first cover 22. A user of camera 20 can use control feature 126 to define the pivotal position of drive member 122 to selectively locate stop 120 in the path of travel of shutter blade 62. When stop 120 is outside the path of travel of shutter blade 62, the shutter mechanism 60 operates as described above. However, when stop 120 is in the path of travel of shutter blade 62, stop 120 blocks shutter blade 62 from reaching the second position. This has two effects. The first effect is that this prevents closure of the flash discharge circuit 108. Because flash discharge circuit 108 cannot be closed, flash energy cannot be released from flash capacitor 102 and no flash of light is discharged from flash tube 112. The second effect is that this limits the of path travel of shutter blade 62 and accordingly reduces exposure time. Thus, camera exposure control system 54 permits the user of camera 20 to selectively enable a flash and uses the user's action of selectively enabling the flash to automatically extend the exposure time. Conversely, this also has the effect of shortening the exposure time where the flash is disabled.

It will be appreciated that the embodiment of the exposure control system shown in FIGS. 2–4 executes a flash exposure strategy that assumes that a user will enable the flash in low light conditions and disable the flash in higher light situations. Under this assumption, exposure control system 54 of FIGS. 2–4 optimizes the appearance of low light images by the expedients of providing artificial illumination and extending exposure time. Also under this assumption, exposure control system 54, constructed in accordance with the embodiment of FIGS. 2–4, optimizes the appearance of images of what arc believed to be scenes having greater ambient light levels by limiting exposure time and thereby preventing overexposure.

Figure 5:
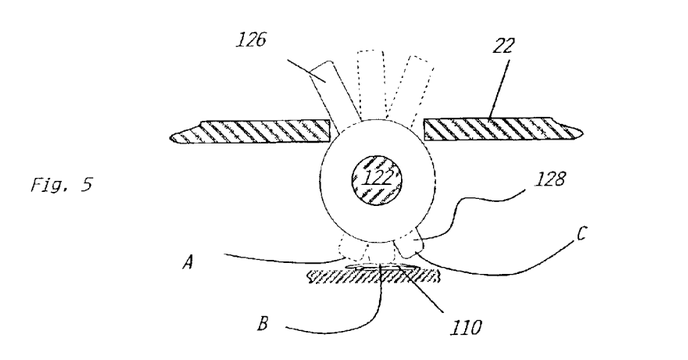
FIG. 5 shows an enlarged view of the exposure control system showing the first cover, base, and drive member in cross section and illustrating the interaction of the first cover, drive member, user control feature, pin, flash charging control switch.
Figure 6:
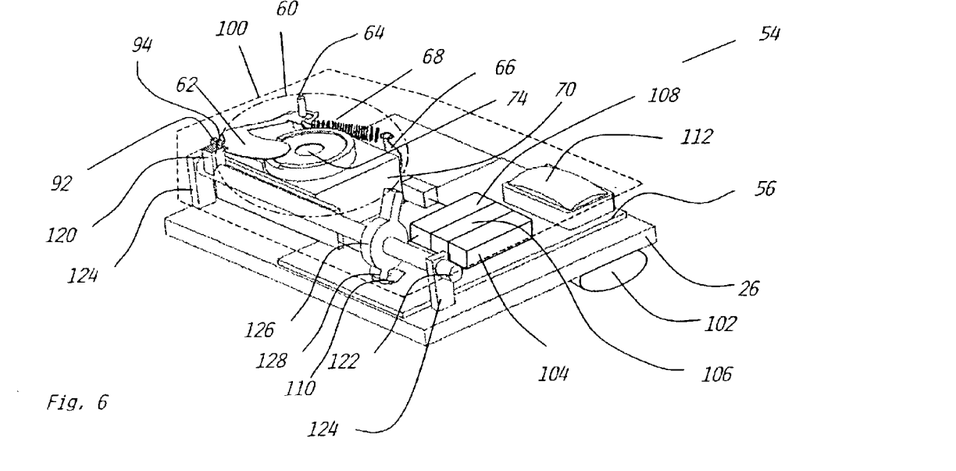
FIG. 6 shows a perspective view of the exposure control system illustrating the relationship between the control feature, drive member, pin and flash charging control switch.

In one embodiment of the present invention, exposure control system 54 also features a pin 128 that is joined to drive member 122 proximate to flash charging control switch 110. As shown in FIGS. 5 and 6, pin 128 is positioned on drive member 122 so that rotation of drive member 122 from the flash disable position to the flash enable position causes pin 128 to move from a first pin position (A) separated from the flash charging control switch 10, through a second pin position (B) wherein pin 128 depresses flash charging control switch 110 and terminating in a third pin position (C) wherein pin 128 is separated from the flash charging control switch 10. It will be appreciated that this motion accomplishes a one touch depression of flash charging control switch 110 which can be used to activate flash charging circuit 106 of the "one-touch" type. Alternatively, pin 128 and flash charging control switch 10 can be positioned so that pin 128 depresses flash charging control switch 110 and holds a flash charging control switch 110 in the depressed position when drive member 122 is in the flash enable position. In this way, a lower cost press and hold circuit can be used for camera flash charging circuit 106. It will be appreciated that under either alternative, the action of moving drive member 122 from the flash disable position to the flash enable position advantageously performs both functions of starting the charging of the flash capacitor 102 and moving stop 120 out of the path of travel of shutter blade 62.

FIGS. 7–11 each show different embodiments of exposure control system 54 and describe how each can be used to implement the above described exposure control strategy.

Figure 7:
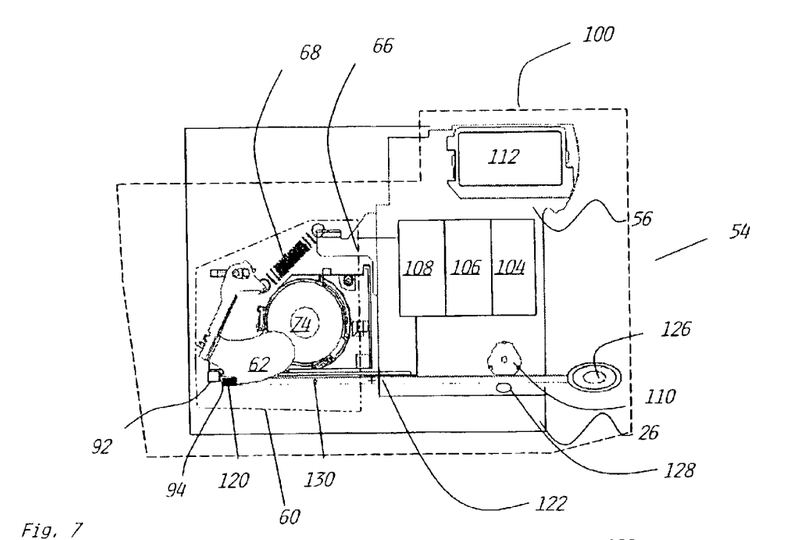
FIG. 7 shows a front view of an embodiment of an exposure control system with a pivotally mounted drive member in a flash disable position.
Figure 8:
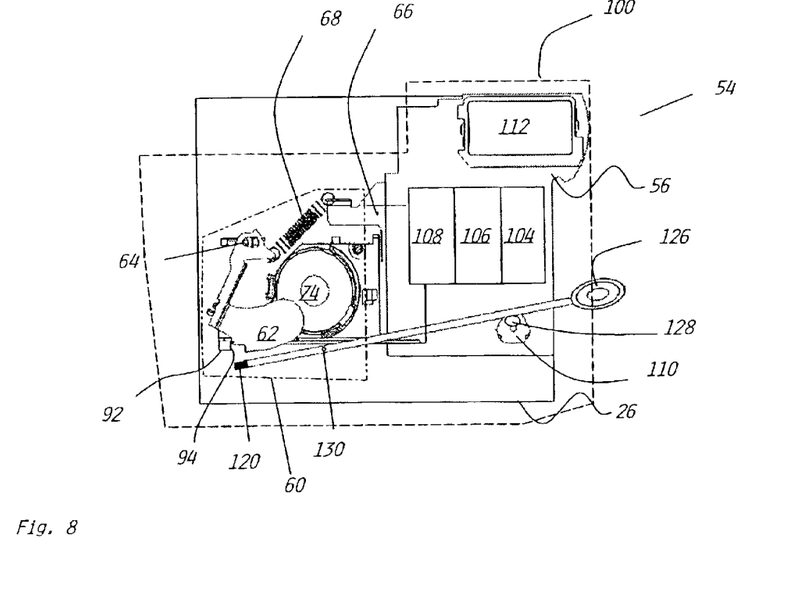
FIG. 8 shows a front view of the embodiment of FIG. 7 with the drive member in the flash enable position.

In the embodiment shown in FIGS. 7 and 8, drive member 122 is mounted to base 56 by way of pivot 130. Drive member 122 is pivotally movable about pivot 130 between a flash enable position shown in FIG. 7 and a flash disable position shown in FIG. 8. As is shown in FIG. 7, stop 120 is mounted at one end of drive member 122 and user control 126 is positioned at the other end. When user control 126 is held in the flash enable position shown in FIG. 7, stop 120 is located outside of the path of travel of shutter blade 62. As described above, this permits shutter blade 62 to engage contact 94 during an exposure cycle to cause a discharge of flash light. However, when user control 126 is moved to the flash disable position shown in FIG. 8, stop 120 is located in the path of travel of shutter blade 62. This prevents shutter blade 62 from engaging contact 94 during an exposure cycle and prevents a discharge of flash light.

Pin 128 is shown in the embodiment of FIGS. 7 and 8. Pin 128 is joined to drive member 122 so that pin 128 depresses flash charging control switch 110 as the drive member is moved from the flash disable position to the flash enable position. This initiates operation of flash charging circuit 106 so that charging of flash capacitor 102 can begin as the user intends to enable the flash.

Figure 9:
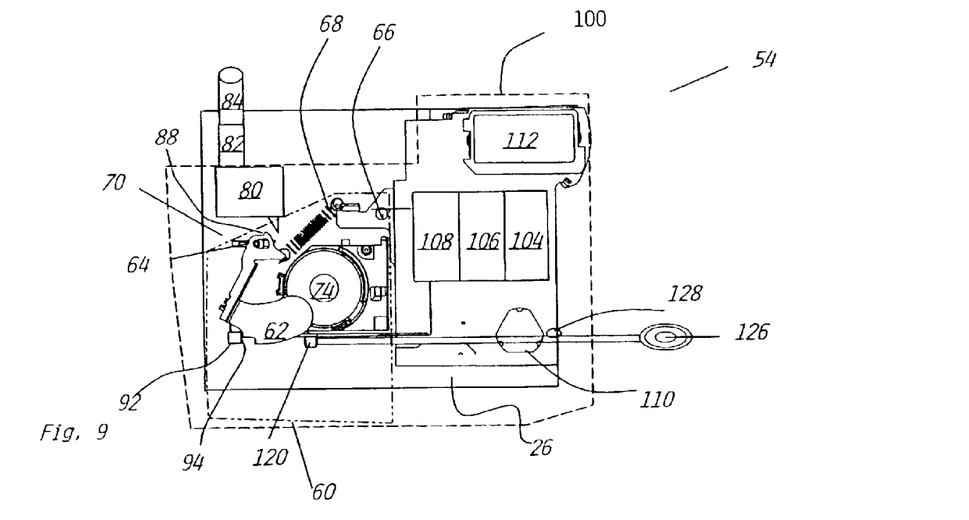
FIG. 9 shows a front view of an embodiment of on exposure control system having a slideable drive member with said slideable drive member in a flash enable position.
Figure 10:
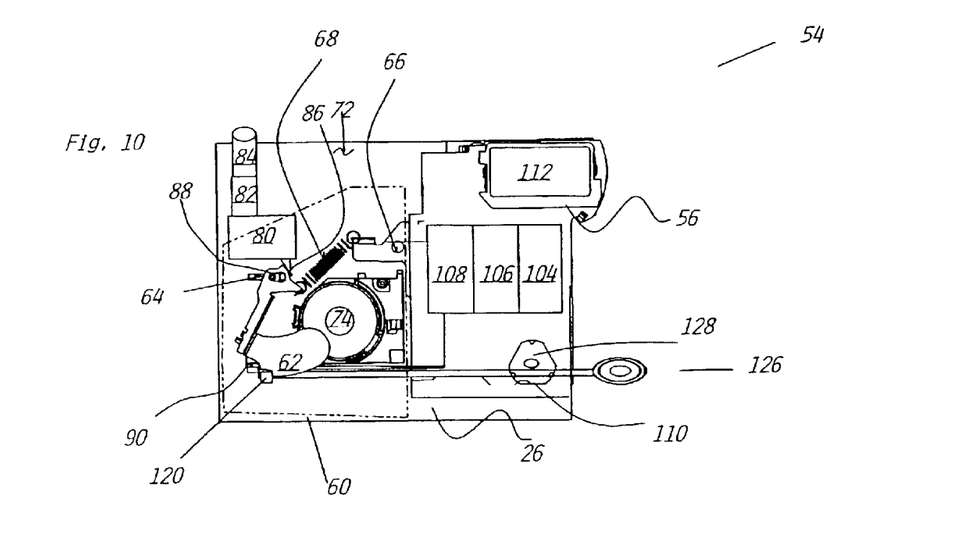
FIG. 10 shows the embodiment of FIG. 9 with the drive member in a flash disable position.

Another embodiment is shown in FIGS. 9 and 10. In this embodiment, drive member 122 is slidably mounted to flash board 56 between a flash enable position shown in FIG. 9 and a flash disable position shown in FIG. 10. As is shown in FIG. 9, stop 120 is mounted at one end of drive member 122 and user control 126 is positioned at the other. When user control 126 is held in the flash enable position shown in FIG. 9, stop 120 is located outside the path of travel of shutter blade 62. As described above, this permits shutter blade 62 to engage contact 94 during an exposure cycle to cause a discharge of flash light. However, when user control 126 is moved to the flash disable position shown in FIG. 10, stop 120 is located in the path of travel of shutter blade 62. This prevents shutter blade 62 from engaging contact 94 during an exposure cycle and prevents a discharge of flash light.

Pin 128 is shown in the embodiment of FIGS. 9 and 10. Pin 128 is joined to drive member 122 so that pin 128 depresses flash charging control switch 110 as the drive member is moved from the flash disable position to the flash enable position. This initiates operation of flash charging circuit 106 so that charging of flash capacitor 102 can begin as the user intends to enable the flash.

Figure 11:
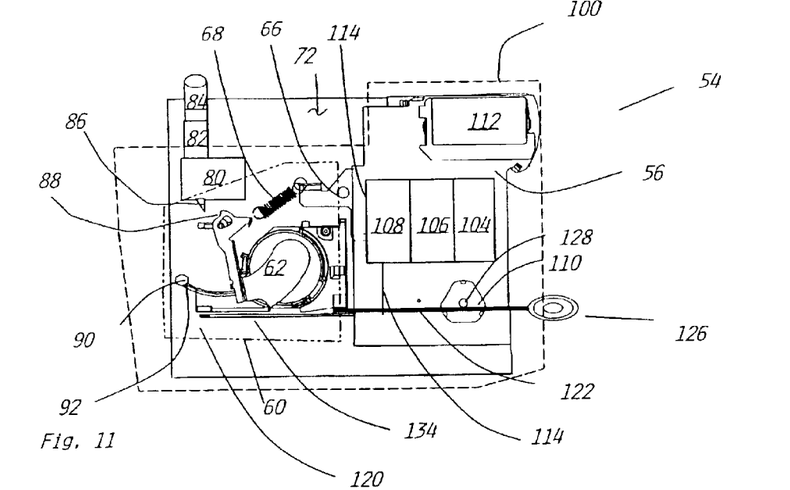
FIG. 11 shows a front view of another embodiment of the exposure control system having a stop positioned on a resilient support and a slidably movable drive member positioned in a flash enable position.
Figure 12:
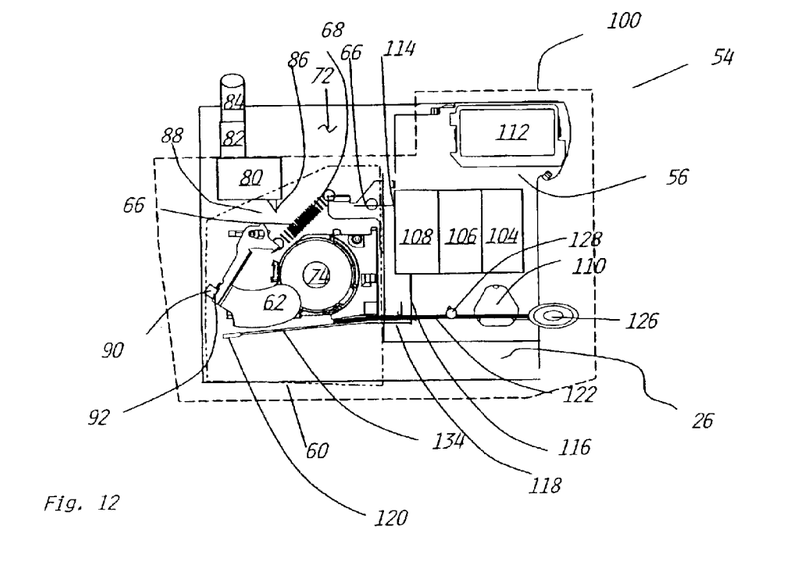
FIG. 12 shows the embodiment of FIG. 11 with the drive member in a flash disable position.

FIGS. 11 and 12 show still another embodiment of exposure control system 54. In this embodiment stop 120 is located on a resilient support 134 that is resiliently biased into a position wherein resilient support 134 locates stop 120 in the path of travel of shutter blade 62. In this embodiment, drive member 122 is slidably movable from a flash disable position shown in FIG. 11 to a flash enable position shown in FIG. 12. Drive member 122 is also formed from a resilient substrate. A deflection surface 136 is positioned in the path of slideable movement of drive member 122 so that as drive member 122 is moved from the flash disable position to the flash enable position, drive member 122 is deflected. As drive member 122 is further moved to the flash enable position, resilient support 134 is further deflected. At some point, resilient support 134 is deflected so that stop 120 is positioned outside the path of travel of shutter blade 62 as shutter blade 62 moves from the first position to the second position. It will be appreciated that as drive member 122 is withdrawn from the flash enable position to the flash disable position shown in FIG. 11, the degree of deflection of resilient support 134 decreases. This returns stop 120 to the path of travel of shutter blade 62.

It will be appreciated that the embodiments shown and described above can also be used to implement an alternative exposure control strategy in which exposure time is reduced when the flash is enabled and the exposure time is increased when the flash is disabled. This strategy reduces the possibility of over exposure when the flash is enabled and underexposure when the flash is disabled.

Figure 13:
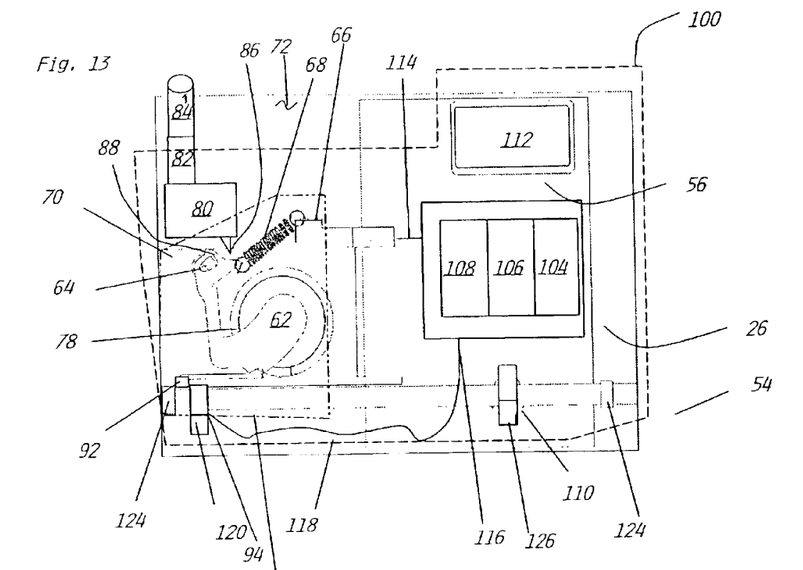
FIGS. 13 and 14 show another embodiment of the exposure control system having a contact positioned on the stop and the drive member in the flash disable position.
Figure 14:
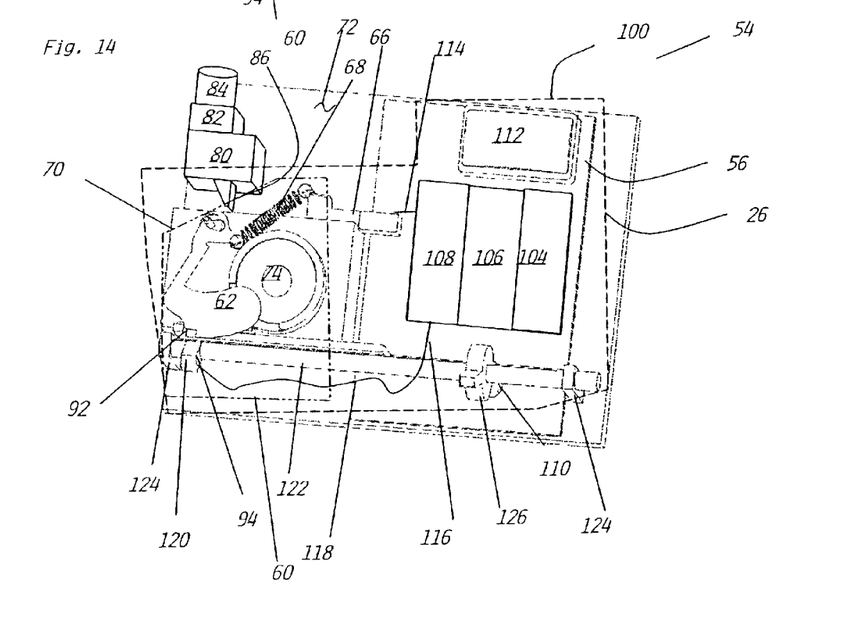

In any of the above listed embodiments, this alternative strategy can be executed by locating detector 90 on stop 120 so that detector 90 can sense shutter blade 62 when stop 120 is located in the path of travel of shutter blade 62 but cannot sense shutter blade 62 when stop 90 is out of the path of travel of shutter blade 62. An example of this is shown in FIG. 13 which depicts the exposure control system 54 of FIG. 2, adapted in this manner. As is shown in FIG. 13, contact 94 is positioned on stop 120 and is incorporated into flash discharge circuit 108 by an electrical connection with lead 118. In this embodiment lead 118 is flexible. Sufficient extra length is provided in lead 116 to permit contact 94 to move from the position shown in FIG. 13 to the position shown in FIG. 14. It will be appreciated that when stop 120 is in the position shown in FIG. 13, both stop 120 and contact 94 are outside the path of travel of shutter blade 62 as it moves from the position shown in FIG. 13 to the position shown in FIG. 14. If an exposure is initiated with the stop 120 and contact 94 in this position, the force imparted by high energy lever 80 drives shutter blade 62 to travel from the first position to the second position. When shutter blade 62 reaches the second position, shutter blade 62 strikes the post 92 and is returned to the first position by biasing force applied by resilient member 68. Because contact 94 does not engage shutter blade 62, flash discharge circuit 108 is not closed during exposure and the flash is effectively disabled.

Figure 15:
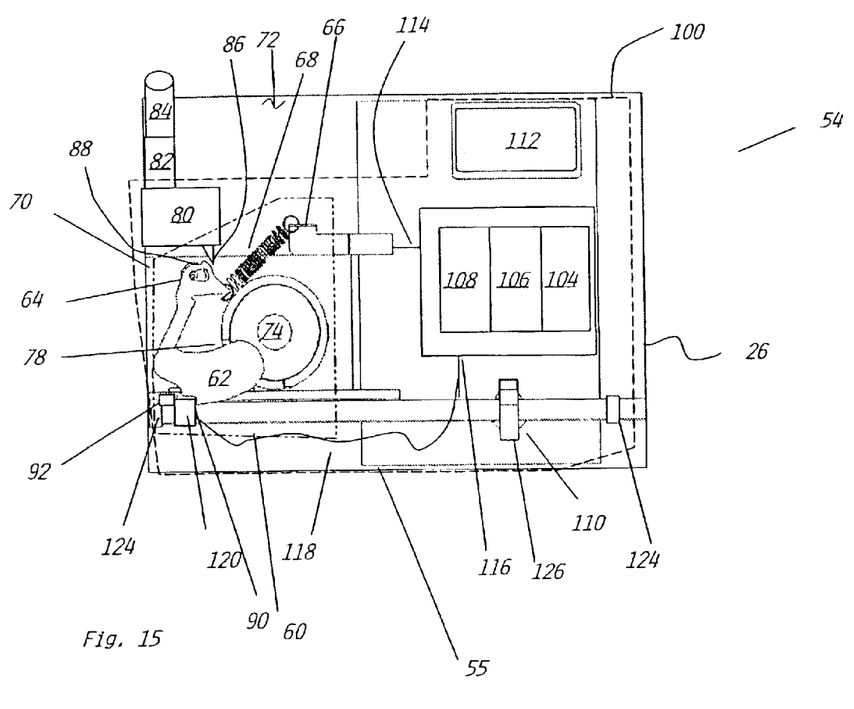
FIG. 15 shows the embodiment of FIGS. 13 and 14 with the contact positioned on the stop and the drive member in the flash enable position.

However, if an exposure is initiated with stop 120 and contact 94 in the position shown in FIG. 15, the force imparted by high energy lever 80 drives shutter blade 62 from the first position to a position where shutter blade 62 strikes contact 94 and stop 120. This has two effects. First, engagement of contact 94 with shutter blade 62 causes flash discharge circuit 108 to close. This, in turn, causes a flash of light to be discharged from flash tube 112. Further, this has the effect of limiting the exposure time because shutter blade 62 cannot travel to the second position. In this way, the shutter time can be effectively limited when the flash is enabled.

The invention has been described in detail with particular reference to certain preferred embodiments thereof, but it will be understood that variations and modifications can be effected within the spirit and scope of the invention.

PARTS LIST 20 camera
22 first cover
24 second cover
26 frame
30 winding mechanism
32 film canister bolder
34 film supply reel area
36 image capture area
38 film supply reel
40 film canister
42 film
44 hub
48 light opening
50 control opening
52 lens
54 exposure control system
56 flash board
58 light passageway
60 shutter mechanism
62 shutter blade
64 pivot
66 resilient member mounting
68 resilient member
70 spacer
72 top surface
74 passageway
78 stop
80 high energy lever
82 latch
84 trigger button
86 latch drive surface
88 shutter drive surface
90 detector
92 post
94 contact
100 flash circuit
102 flash capacitor
104 power supply
106 flash charging circuit
108 flash discharge circuit
110 flash charging control switch
112 flash tube
114 lead
116 lead
118 lead
120 stop
122 drive member
124 mounting
126 user control
128 pin
130 pivot
134 resilient support
136 deflection surface

What is claimed is:

1. A camera exposure control system comprising:
   a shutter movable during an exposure period through a path of travel between a first position and a second position;
   a detector to sense the shutter and to generate a signal when the shutter is at a flash trigger position in the path of travel;
   a flash circuit receiving the signal generated by the detector and causing a flash of light to discharge when the signal is received; and,
   a stop selectively movable from a location out of the path of travel of the shutter to a location in the path of travel of the shutter;
   wherein the location of the stop determines whether the detector can sense the shutter during the exposure.

2. The camera exposure control system of claim 1, wherein the flash trigger position is defined at the second position and the stop is selectably movable from a location out of the path of travel of the shutter and into a location that blocks the shutter at a third position between the first position and the second position.

3. The camera exposure control system of claim 1, wherein the second position is selected to provide an exposure period that is adapted for photography with artificial illumination.

4. The camera exposure control system of claim 2, wherein the third position is selected to provide an exposure period that is adapted for photography without artificial illumination.

5. The camera exposure control system of claim 1, wherein the stop is selectably movable from a location wherein the stop is outside of the path of travel of the shutter and a location that blocks the shutter at a third position between the first position and the second position.

6. The camera exposure control system of claim 5, wherein the detector generates a signal when the shutter is blocked at the third position.

7. The camera exposure control system of claim 6, wherein the detector is positioned on the stop so that the detector generates a signal wherein the shutter is blocked at the third position but does not generate a signal as the shutter passe through the third position when the stop is positioned outside of the path of travel of the shutter.

8. The camera exposure control system of claim 6, wherein the second position is selected to provide an exposure period that is adapted for photography without artificial illumination.

9. The camera exposure control system of claim 6, wherein the third position is selected to provide an exposure period that is adapted for photography with artificial illumination.

10. The camera exposure control system of claim 1, wherein the detector is a switch adapted to engage the shutter.

11. The camera exposure control system of claim 1, wherein the detector optically senses the shutter.

12. The camera exposure control system of claim 1, wherein the detector electro-magneically detects the shutter.

13. The camera exposure control system of claim 1, wherein the detector comprises an electrical contact, and wherein the shutter comprises an electrically conductive shutter connected in series with the flash circuit and contact so that when the shutter engages the contact, a circuit is completed causing the flash circuit to generate a flash of light.

14. The camera exposure control system of claim 13, wherein the stop comprises the contact.

15. The camera exposure control system of claim 1, further comprising a drive member that controllably locates the stop in response to a user input.

16. The camera explore control system of claim 15, wherein said drive member comprises a dial rotatable between a position that locates the stop in a location that prevents flash discharge during an exposure and a position that locates the stop in a location that enables flash discharge during an exposure.

17. The camera exposure control system of claim 15 wherein said drive member is pivotally movable between a position that locates the stop in a location that prevents flash discharge during an exposure and a position that locates tie stop in a location that enables flash discharge during an exposure.

18. The camera exposure control system of claim 15, wherein said drive member further comprises a biasing surface positioned to bias the flash charger control switch to enable the flash charging circuit to charge the flash energy source as the drive member is moved from a position that locates the stop in a location that prevents flash discharge during an exposure to a position that locates the stop in a location that permits flash discharge during an exposure.

19. The camera exposure control system of claim 1, further comprising a resiliently deformable support for supporting the stop and a drive member movable from a first position where the drive member drives the resiliently deformable member so that the stop is outside the path of travel of the shutter and a second position where the drive member does not drive the stop outside the path of travel of the shutter.

20. The camera exposure control system of claim 15, wherein the drive member is slidably movable between a position that locates the stop in a location that prevents flash discharge during an exposure and a position that locates the stop in a location that enables flash discharge during an exposure.

21. The camera exposure control system of claim 1, wherein the flash circuit comprises a flash energy source, a power supply aid a flash charging circuit for charging the flash energy source with electrical charge wherein said flash charging circuit has a flash charger activation switch that is normally biased into a position that prevents the flash charging circuit from charging the flash energy source.

22. The camera exposure control system of claim 21, further comprising a drive member to locate the stop with the drive member movable between a position that locates the stop in a location that prevents flash discharge during an exposure and a position that locates the stop in a location that enables flash discharge during an exposure wherein the drive member further comprises a switch engagement surface to engage the flash charger activation switch so that the flash charger activation switch enables the flash charging circuit when the drive member is in the position that locates the stop in a location that enables flash discharge.

23. The camera exposure control system of claim 21, further comprising a drive member to locate the stop with the drive member movable between a position that locates the stop in a location that prevents flash discharge during an exposure and a position that locates the stop in a location that enables flash discharge during an exposure wherein the drive member further comprises a switch engagement surface to engage the flash charger activation switch so that the flash charger activation switch enables the flash charging circuit as the drive member is moved to the position that locates the stop in a location that enables flash discharge.

24. A camera exposure control system comprising:
a conductive shutter movable between a first pivotal position and a range of exposure positions ending at a second position, with said shutter biased to return to the first pivotal position after movement into a second pivotal position;
a contact to electrically engage the shutter;
a camera flash circuit including an electrically charged capacitor and a flash tube with said camera flash circuit connected to the shutter and causing electrical energy from the electrically charged capacitor to pass through the flash tube when the shutter electrically engages the contact; and,
a stop selectably located in the path of travel of the shutter and said stop being movable between a flash off location that prevents the shutter from engaging the contact as the shutter is moved and a flash on location that permits the shutter to engage the con act.

25. The camera exposure control system of claim 24, wherein the contact comprises a conductive post that blocks the movable shutter to define the second position and the stop is movable between a location that permits the shutter to move into the second position and a location that blocks the shutter at a third position between the first position and the second position.

26. The camera exposure control system of claim 25, wherein the second position is selected to provide an exposure period that is adapted for photography with artificial illumination.

27. The camera exposure control system of claim 25, wherein the third position is selected to provide an exposure period adapted for photography without artificial illumination.

28. The camera exposure control system of claim 24, wherein the contact is positioned on the stop and wherein the stop is located at a third position in the path of travel of the shutter when the stop is in the flash on location.

29. The camera exposure control system of claim 28, wherein the second position is selected to provide an exposure period that is adapted for photography without artificial illumination.

30. The camera exposure control system of claim 28, wherein the third position is selected to provide an exposure period adapted for photography with artificial illumination.

31. A camera comprising:
a housing having an opening to admit light from a scene;
an imaging gate for positioning an imaging surface to receive light from the scene;
a shutter movable during an exposure period through a path of travel between a first position wherein the shutter blocks light from the scene from traveling to the imaging surface and a second position wherein the shutter permits light from the scene to travel to the imaging surface;

a detector to sense the shutter and to generate a signal when the shutter is at a flash trigger position in the path of travel;

a flash circuit receiving the signal generated by the detector and causing a flash of light to discharge when the signal is received; and, a stop selectively movable from a location out of the path of travel of the shutter to a location in the path of travel of the shutter;

wherein the location of the stop determines whether the detector can sense the shutter during the exposure.

32. The camera of claim 31, wherein the flash trigger position is defined at the second position and the stop is selectably movable from a location out of the path of travel of the shutter and into a location that blocks the shutter at a third position between the first position and the second position.

33. The camera of claim 31, wherein the second position is selected to provide an exposure period that is adapted for photography with artificial illumination.

34. The camera of claim 32, wherein the third position is selected to provide an exposure period that is adapted for photography without artificial illumination.

35. The camera of claim 31, wherein the stop is selectably movable from a location wherein the stop is outside the path of travel of the shutter and a location that blocks the shutter at a third position between the first position and the second position.

36. The camera of claim 35, wherein the detector generates a signal when the shutter is blocked at the third position.

37. The camera of claim 36, wherein the detector is positioned on the stop so that the detector generates a signal when the shutter is blocked at the third position but does not generate a signal as the shutter passes through the third position when the stop is positioned outside of the path of travel of the shutter.

38. The camera of claim 36, wherein the second position is selected to provide an exposure period that is adapted for photography without artificial illumination.

39. The camera of claim 36, wherein the third position is selected to provide an exposure period that is adapted for photography with artificial illumination.

40. The camera of claim 31, wherein the detector is a switch adapted to engage the shutter.

41. The camera of claim 31, wherein the detector optically senses the shutter.

42. The camera of claim 31, wherein the detector electromagnetically detects the shutter.

43. The camera of claim 31, wherein the detector comprises an electrical contact, and wherein the shutter comprises an electrically conductive shutter connected in series with the flash circuit and contact so that when the shutter engages the contact, a circuit is completed causing the flash circuit to generate a flash of light.

44. The camera of claim 43, wherein the stop comprises the contact.

45. The camera of claim 31, further comprising a drive member that controllably locates the stop in response to a user input.

46. The camera of claim 45, wherein said drive member comprises a dial rotatable between a position that locates the stop in a location that prevents flash discharge during an exposure and a position that locates the stop in a location that enables flash discharge during an exposure.

47. The camera of claim 45 wherein said drive member is pivotally movable between a position that locates the slop in a location that prevents flash discharge during an exposure and a position that locates the stop in a location that enables flash discharge during an exposure.

48. The camera of claim 45, wherein said drive member further comprises a biasing surface positioned to bias the flash charger control switch to enable the flash charging circuit to charge the flash energy source as the drive member is moved from a position that locates the stop in a location that prevents flash discharge during an exposure to a position that locates the stop in a location that permits flash discharge during an exposure.

49. The camera of claim 31, further comprising a resiliently deformable support for supporting the stop and a drive member movable from a first position where the drive member drives the resiliently deformable member so that the stop is outside the path of travel of the shutter and a second position where the drive member does not drive the stop outside the path of travel of the shutter.

50. The camera of claim 45, wherein the drive member is slidably movable between a position that locates the stop in a location that prevents flash discharge during an exposure and a position that locates the stop in a location that enables flash discharge during an exposure.

51. The camera of claim 31, wherein the flash circuit comprises a flash energy source a power supply and a flash charging circuit for charging the flash energy source with electrical charge wherein said flash charging circuit has a flash charger activation switch that is normally biased into a position that prevents the flash charging circuit from charging the flash energy source.

52. The camera of claim 51, further comprising a drive member to locate the stop with the drive member movable between a position that locates the stop in a location that prevents flash discharge during an exposure and a position that locates the stop in a location that enables flash discharge during an exposure wherein the drive member further comprises a switch engagement surface to engage the flash charger activation switch so that the flash charger activation switch enables the flash charging circuit when the drive member is in the position that locates the stop in a location that enables flash discharge.

53. The camera of claim 51, further comprising a drive member to locate the stop with the drive member movable between a position that locates the stop in a location that prevents flash discharge during an exposure aid a position that locates the stop in a location that enables flash discharge during an exposure wherein the drive member further comprises a switch engagement surface to engage the flash charger activation switch so that the flash charger activation switch enables the flash charging circuit as the drive member is moved to the position that locates the stop in a location that enables flash discharge.

54. A camera comprising:
a housing having an opening to admit light from a scene the housing containing
an imaging gate for positioning an imaging surface to receive the light;
a conductive shutter movable between a first pivotal position wherein the shutter prevents light from passing from (he scene to the imaging surface and a range of exposure positions ending at a second position, with said shutter biased to retune to the first pivotal position after movement into a second pivotal position;
a contact to electrically engage the shutter;
a camera flash circuit including an electrically charged capacitor and a flash tube with said camera flash circuit connected to the drive member and causing electrical energy from the electrically charged capacitor to pass through the flash tube when the shutter electrically engages the contact; and, a stop selectably located in the path of travel of the shutter aid said stop being movable between a flash off location that prevents the shutter from engaging the contact as the shutter is moved and a flash on location that permits the shutter to engage the contact.

55. The camera of claim 49, wherein the contact comprises a conductive post that blocks the movable shutter to define the second position and the stop is movable between a location that permits the shutter to move into the second position and a location that blocks the shutter at a third position between the first position and the second position.

56. The camera of claim 55, wherein the second position is selected to provide an exposure period that is adapted for photography with artificial illumination.

57. The camera of claim 55, wherein the third position is selected to provide an exposure period adapted for photography without artificial illumination.

58. The camera of claim 49, wherein the contact is positioned on the stop and wherein the stop is located at a third position in the path of travel of the shutter when the stop is in the flash on location.

59. The camera of claim 58, wherein the second position is selected to provide an exposure period that is adapted for photography without artificial illumination.

60. The camera of claim 58, wherein the third position is selected to provided an exposure period adapted for photography with artificial illumination.

* * * * *

UNITED STATES PATENT AND TRADEMARK OFFICE
CERTIFICATE OF CORRECTION

PATENT NO. : 6,701,077 B2
DATED : March 2, 2004
INVENTOR(S) : David J. Cornell et al.

It is certified that error appears in the above-identified patent and that said Letters Patent is hereby corrected as shown below:

Title page,
Item [74], *Attorney, Agent or Firm*, delete "Ronald" insert -- Roland --

Column 14,
Line 2, delete "slop", insert -- stop --
Line 45, delete "aid", insert -- and --

Column 15,
Line 4, delete "aid", insert -- and --

Signed and Sealed this

Eighth Day of February, 2005

JON W. DUDAS
*Director of the United States Patent and Trademark Office*